(12) United States Patent
Langis

(10) Patent No.: US 6,536,120 B1
(45) Date of Patent: Mar. 25, 2003

(54) POWERED CIRCULAR SAW FOR LEFT OR RIGHT HANDED OPERATION

(76) Inventor: Steven J. Langis, 33 Tremont St., Peabody, MA (US) 01960

( * ) Notice: Subject to any disclaimer, the term of this patent is extended or adjusted under 35 U.S.C. 154(b) by 0 days.

(21) Appl. No.: 09/697,847

(22) Filed: Oct. 27, 2000

(51) Int. Cl.[7] .......................... B23D 47/02; B25F 3/00; B27B 9/02
(52) U.S. Cl. ............................. 30/391; 30/376; 30/377; 30/123.3
(58) Field of Search .................. 30/123, 124, 123.3, 30/276, 376, 377, 388, 389, 390, 391

(56) References Cited

U.S. PATENT DOCUMENTS

| | | | | |
|---|---|---|---|---|
| 5,235,752 A | * | 8/1993 | Sauerwein et al. | 30/377 |
| 5,689,884 A | * | 11/1997 | Wershe | 30/123.3 |
| 5,758,425 A | * | 6/1998 | Gallagher et al. | 30/376 |
| 5,873,169 A | * | 2/1999 | James et al. | 30/391 |
| 6,202,311 B1 | * | 3/2001 | Nickels, Jr. | 30/376 |
| 6,308,424 B1 | * | 10/2001 | Stielper | 30/391 |
| 6,318,352 B1 | * | 11/2001 | Gnazzo et al. | 30/388 |

* cited by examiner

*Primary Examiner*—Hwei-Siu Payer
(74) *Attorney, Agent, or Firm*—Don Halgren

(57) ABSTRACT

The present invention involves an air empowered circular saw apparatus for the cutting of material by either a left handed or a right handed operator. The apparatus includes an elongated base plate with a support frame extending from one side thereof; and an output housing supported on the distal end of the support frame, with an elongated drive motor housing supported on one side of the support frame. A saw blade is supported on the opposed side of the support frame, wherein the drive motor housing is swingable about an axis of rotation of an output shaft through the output housing to permit handed control of the air powered saw apparatus to be changed.

14 Claims, 2 Drawing Sheets

POWERED CIRCULAR SAW FOR LEFT OR RIGHT HANDED OPERATION

BACKGROUND OF THE INVENTION

This invention relates to tools and more particularly to powered circular saw tools for use by left or right-handed craftsmen.

PRIOR ART

The art of cutting wood has come a long way since the bow saw or the elongated hand saw. Modern craftsmen of today typically utilize power saws having electrical motors thereon. These are handy devices. However, typically electrical motor powered saws are not both left and right handed, and electrical powered saws are unusable where there is no electricity available to power them.

Batteries have powered hand tools for some time now, however batteries are heavy, they discharge fairly rapidly, and add to the cumbersome nature of the tool or equipment being powered thereby.

It is the object of the present invention, to overcome these disadvantages of the prior art.

It is a further object of the invention, to provide a hand manipulable power saw which does not need electricity to power its operation.

It is still yet a further object of the present invention, to provide a power circular saw that is readily adaptable for left hand use or right hand use.

It is yet a further object of the present invention to provide a circular device which that may be powered by pressurized air.

It is still yet a further object of the present invention, to provide a saw which can be utilized by a left handed person, a right handed person, with appropriate blade safety shielding.

It is another object of the present invention to provide a circular saw wherein the direction of blade rotation may be changed very readily, and wherein any jamming of a saw blade would not have a deleterious effect the drive motor thereof.

BRIEF SUMMARY OF THE INVENTION

The present invention comprises a portable multi-handed circular power saw which in one embodiment is empowered by a compressed air source. The power saw apparatus comprises an elongated generally rectangular face plate having a generally vertically disposed support frame arranged approximately at a midpoint thereof. The support frame has a drive shaft housing enclosed at its upper or distalmost end. The drive shaft housing has a first end to which an output driveshaft extends. A circular saw blade is attached to the distal end of the output driveshaft. A curvilinear blade shield arrangement is articulably attached to the driveshaft housing, to enable it to be moved arcuately adjacent to the circumference of the circular saw blade.

The elongated motor housing has a first end and a second end. For the air driven embodiment, an air inlet is arranged at the second end of the motor housing. The air inlet controllably discharges pressurized air within the elongated motor housing in conjunction with an air direction control valve arranged therewithin. The air direction control valve is adjusted by a forward and reverse switch mounted on the outside of the motor housing. The air direction control valve variably directs air onto a rotatable drive rotor mounted in a bearing supported arrangement within the motor housing, to readily change the direction of the rotor and hence the direction of rotation of the blade. The drive rotor is connected to a power output driveshaft through a pinion gearing at the first end of the elongated motor housing.

A deflectable air vent is arranged through the side wall of the elongated motor housing. The air vent is preferably directable towards a point onto the base plate, so as to permit discharged compressed air to blow away sawdust from the base plate and rotating saw blade.

An elongated on/off switch is arranged on the outside of the motor housing, adjacent its second end. The on/off switch is adapted so as to permit compressed air to be released through the air direction control valve by the user's left or right hand.

A guide handle extends from the first end of the elongated motor housing to which it is attached. The guide handle is in longitudinal alignment with the axis of the output drive shaft extending through the driveshaft housing.

A compressed air source is in communication with the pneumatically empowered circular saw through a coiled air hose attachable therebetween. In an electric motor powered version, the housing would contain an electric motor supplied by an electric cable or by batteries.

In either motor embodiment, the elongated motor housing is flipable about an arc of 180 degrees by a pivot support arranged at the distal end of the vertical support frame extending from the base plate. By shifting the elongated motor housing from one end of the elongated base plate to the other end of the elongated base plate, change of "hand-control" is permitted of the saw arrangement from a right hand to a left hand, or vice versa. The user's "predominant" hand is juxtaposed about the elongated motor housing at the second or remote end, and the user's "other" hand is utilized to hold the guide handle.

Flipping the elongated motor housing about its power output axis permits a left handed or right handed individual to use the same piece of equipment, or permits a dexterous craftsman to utilize the same piece of equipment in a more universal manner.

The vertically arranged support frame extending from the baseplate has a shaft housing tilt adjustment mechanism arranged therewith, to permit tilting of the output axis with respect to the baseplate so as to go from a parallel to a non-paralleled or skewed relationship therewith thus effecting the perpendicularity or non-perpendicularity of the sawblade and its cutting angle with respect to the base plate.

The vertical support frame extending from the base plate is also vertically adjustable by virtue of a pair of threadedly interengagable components thereof to effect vertical displacement of the output shaft from the baseplate, and hence effect the depth of cut of the circular sawblade with respect to that baseplate.

In the air powered embodiment, the deflectable airvent extending from the "saw" side of elongated motor housing is articulable so as to effect a blowing away of sawdust regardless of whether the elongated motor housing is in its left handed or right handed use configuration with respect to the elongated baseplate.

The elongated baseplate has a v-shaped notch at a first end thereof, to function as a right hand site mark, and the baseplate has a second end with a v-shaped notch to effect a left hand site mark, the right and left hand site marks being in longitudinal alightment with the circular saw blade. It is to be noted that the width of the baseplate could be limited to its size at those right hand site and left hand site marks.

Thus, what has been shown is a unique portable electric or compressed air powered rotary circular saw which is utilizable by either a left handed or a right handed individual, by virtue of its flipability of its elongated motor housing from one end to the other, about a drive shaft axis. This permits a user to maneuver the saw when particular cutting restrictions require it. This same power saw arrangement in the air powered construction permits its sawdust to be blown away by the compressed air which has been used by the drive rotor within the elongated motor housing. Thus the power source is also a means for removing sawdust and facilitating the accuracy of the cutting activity.

The invention thus comprises an empowered circular saw apparatus for the cutting of material by either a left handed or a right handed operator, comprising: an elongated base plate with a support frame extending from one side thereof; and an output housing supported on the distal end of the support frame, with an elongated drive motor housing supported on one side of the support frame and a saw blade supported on the opposed side of the support frame. The drive motor housing is swingable about an axis of rotation of an output shaft through the output housing, to permit handed control of the saw apparatus to be changed. The drive motor housing encloses an air powered rotor by which the circular saw blade is rotated. The drive motor housing includes a dust blowing articulable nozzle. The drive motor housing has an air direction control valve arranged therein, to permit control of direction of the rotor therein. A guide handle may be arranged in longitudinal alignment with the axis of rotation of the output shaft. A an elongated on/off switch may be arranged externally of the drive motor housing to permit the saw apparatus to be controlled whether the elongated drive motor housing is in a left-hand use mode or a right-hand use mode. The guide handle assists in control of the saw apparatus whether the saw apparatus is in a left-hand use mode or a right-hand use mode. The support frame has a tilt mechanism arranged with the output shaft housing to permit the output shaft to be tilted with respect to the baseplate. The support frame has a height control mechanism therein to permit a height adjustment to be made with respect to the output shaft housing and the baseplate.

The invention also comprises an empowered circular saw apparatus for the cutting of material by either a left handed or a right handed operator, comprising: an elongated base plate with a support frame extending from one side thereof; and an output housing supported on the distal end of the support frame, with an elongated drive motor housing supported on one side of the support frame and a saw blade supported on the opposed side of the support frame, wherein a drive rotor supported within the drive motor housing is driven by pressurized air from a pressurized air source in communication with the housing through a conduit arranged therebetween. The drive motor housing may be swingable about an axis of rotation of an output shaft through the output housing to permit handed control of the saw apparatus to be changed. The drive motor housing has a direction control valve therewithin to control the direction of pressurized air to the drive rotor within the housing.

The invention also includes a method of cutting material from a left handed orientation and a right handed orientation of a saw apparatus, comprising the steps of: supporting a drive motor arranged within an elongated drive motor housing thereon on a support frame on an elongated base plate; empowering the drive motor to rotate a saw blade through an output shaft also supported by the support frame; cutting the material by the saw; and moving the elongated drive motor housing about an axis of the output shaft through an arc of about 180 degrees to permit the saw apparatus to be operated to cut by an opposite hand. The method also includes the steps of supplying the drive motor housing with a pressurized air from a pressurized air source to permit the blade to be rotated, controlling the direction of rotation of the saw blade by a air flow direction control valve arranged within the drive motor housing and in communication with the pressurized air source.

BRIEF DESCRIPTION OF THE DRAWINGS

The objects and advantages of the present invention will become more apparent, when viewed in conjunction with the following drawings in which.

DETAILED DESCRIPTION OF THE PREFERRED EMBODIMENTS

Figure 1:
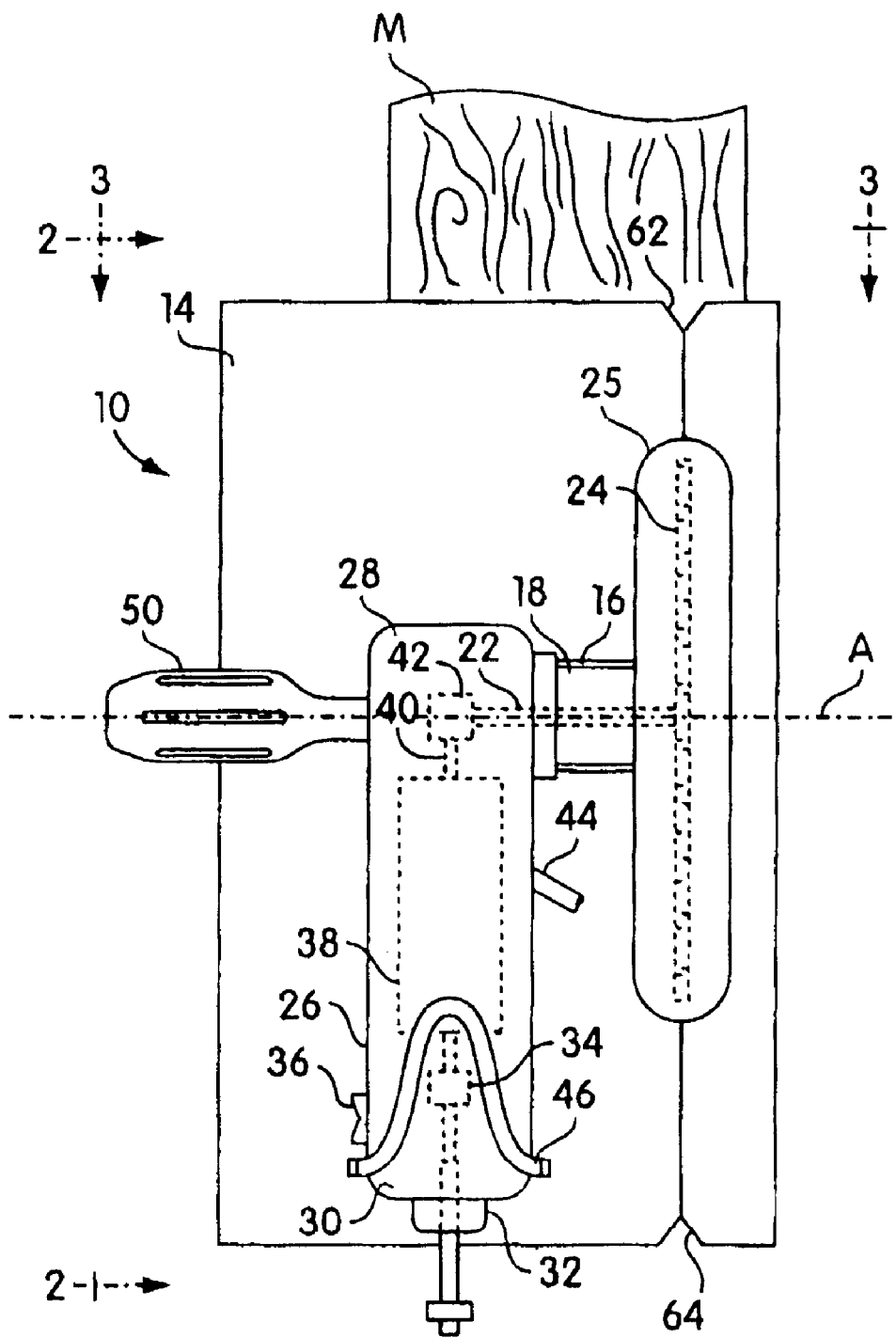
FIG. 1 is a plan view of a air powered portable circular saw apparatus constructed according to the principles of the present invention.

The present invention involves a portable circular power saw apparatus 10 which in a first embodiment is empowered by a compressed air source 12, as may be seen in FIG. 1. The power saw apparatus 10 comprises an elongated generally rectangular base plate 14 having a generally vertically disposed support frame 16 arranged approximately at a midpoint thereof. The support frame 16 has a drive shaft housing 18 enclosed at its upper or distalmost end, as may be seen from FIG. 3. The drive shaft housing 18 has a first end 20 through which an output driveshaft 22 extends. A circular saw blade 24 is attached to the distal end of the output driveshaft 22. A curvilinear blade shield arrangement 25 is articulably attached to the driveshaft housing 18, to enable it to be moved arcuately adjacent to the circumference of the circular saw blade 24. A coil spring 27 is connected to the shield support arms 29 to permit the shield 25 to pivot in either direction depending on saw "hand" use.

Figure 2:
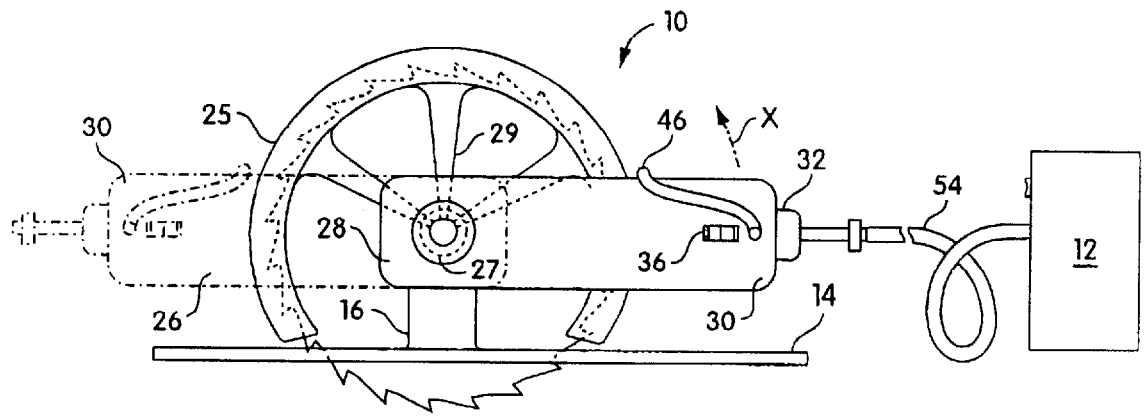
FIG. 2 is a side elevational view of the power saw apparatus taken according to the lines 2—2 of FIG. 1.

An elongated motor housing 26 is secured to the other or second end of the driveshaft housing 18. The elongated motor housing 26 has a first end 28 and a second end 30. In the air powered embodiment, an air inlet 32 is arranged at the second end 30 of the motor housing 26, as is shown in FIGS. 1 and 2. The air inlet 32 controllably discharges pressurized air within the elongated motor housing 26 in conjunction with an air direction control valve 34 arranged therewithin. The air direction control valve 34 is adjusted by a forward and reverse switch 36 mounted on the outside of the motor housing 26. The air direction control valve 34 variably directs air (either flow speed or rotational direction, onto a rotatable drive rotor 38 mounted in a bearing supported arrangement (not shown for clarity) within the motor housing 26. The drive rotor 38 is connected to a power output driveshaft 40 through a pinion gearing 42 within the first end 28 of the elongated motor housing 26.

A deflectable air vent or nozzle 44 is arranged through the side wall of the elongated motor housing 26. The air vent 44 is preferably directable towards a point onto the base plate 14, as shown in FIG. 1, so as to permit discharged compressed air to blow away sawdust from the base plate 14 and the rotating saw blade 24.

An elongated on/off switch 46 is arranged on the outside of the motor housing 26, adjacent its second end 30. The on/off switch 46 is adapted so as to permit compressed air to be released through the air direction control valve 34 by the user's left or right hand.

A guide handle 50 extends from the first end 28 of the elongated motor housing 26 to which it is attached. The guide handle 50 is in longitudinal alignment with the axis "A" of the output drive shaft 22 extending through the drive shaft housing 18.

The compressed air source 12 is in communication with the pneumatically empowered circular saw 10 through a coiled air hose 54 attachable therebetween.

The elongated motor housing 25 is flippable (swingable) about an arc of 180 degrees by a pivot support 56 arranged at the distal end of the vertical support frame 16 extending from the base plate 14. By shifting the elongated motor housing 26 from one end of the elongated base plate 14 to the other end of the elongated base plate 14, as indicated by the arrow "X" in FIG. 2, change of "hand-control" is permitted of the saw arrangement from a right hand to a left hand, or vice versa. The user's "predominant" hand may be juxtaposed about the elongated motor housing 26 at the second or remote end, and the user's "other" hand may be utilized to hold the guide handle 50.

Flipping the elongated motor housing 26 about its power output axis "A" permits a left handed and a right handed individual to use the same piece of equipment, or permits a dexterous craftsman to utilize the same piece of equipment in a more universal manner to cut material "M". A releasable snap lock 31 permits the releasable locking of the motor housing 26 into either "hand" mode.

Figure 3:
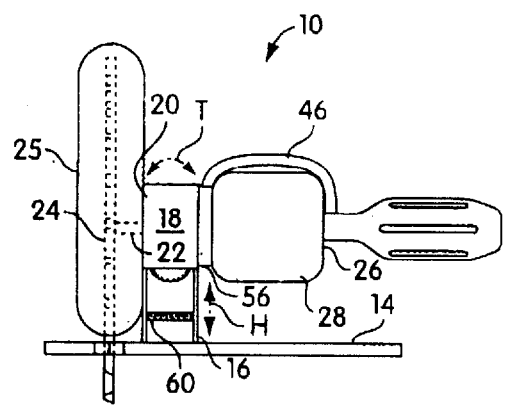
FIG. 3 is a view taken along the lines 3—3 of FIG. 1.

The vertically arranged support frame 16 extending from the baseplate 14 has a shaft housing tilt adjustment mechanism 58 arranged therewith, to permit tilting of the output axis housing 18 with respect to the baseplate 14 so as to go from a parallel to a non-parallel or skewed relationship therewith thus effecting the perpendicularity or non-perpendicularity of the sawblade 24 and its cutting angle, as indicated by the arrow "T" in FIG. 3.

The vertical support frame 16 arranged on and extending from the base plate 14 is also vertically adjustable by virtue of a pair of threadably interengagable telescoping components 60 thereof to effect vertical displacement of the output shaft housing 18 from the baseplate 14, and hence effect the depth of cut of the circular sawblade 24 with respect to that baseplate 14, as indicated by the arrow "H" in FIG. 3.

The deflectable air vent 44 extending from the "saw" side of elongated motor housing 26 is articulable so as to effect a blowing away of sawdust regardless of whether the elongated motor housing 26 is in its left handed or right handed use configuration with respect to the elongated baseplate 14.

The elongated baseplate 14 has a v-shaped notch 62 at a first end thereof, to function as a right hand site mark, and the baseplate has a second end with a v-shaped notch 64 to effect a left hand site mark, the right and left hand site marks being in longitudinal alignment with the circular saw blade 24. It is to be noted that the width of the baseplate 14 could be limited to its width at those right hand site and left hand site marks.

Thus, what has been shown is a unique portable electric or compressed air powered rotary circular saw apparatus 10 which is utilizable by either a left handed or a right handed individual, by virtue of its flippability of its elongated motor housing 26 from one end to the other, about the axis "A" of its drive shaft housing 18. This permits a user to maneuver the saw when particular cutting restrictions require it. With the same air powered saw arrangement also permits its sawdust to be blown away by the compressed air which has been used by the drive rotor within the elongated motor housing. Thus the air power source is also a means for removing sawdust and facilitating the accuracy of the cutting activity.

I claim:

1. An empowered circular saw apparatus for the cutting of material by either a left handed or a right handed operator, comprising:

an elongated base plate with a support frame extending from one side thereof; and an output housing supported on a distal end of said support frame, with an elongated drive motor housing supported on one side of said support frame and a saw blade supported on the opposed side of said support frame, wherein a drive rotor supported within said drive motor housing is driven by pressurized air from a pressurized air source in communication with said drive motor housing through a conduit arranged therebetween; and wherein said drive motor housing is swingable about an axis of rotation of an output shaft through said output housing to permit the handed control of said saw apparatus to be changed.

2. The empowered circular saw apparatus as recited in claim 1, wherein said drive motor housing has a direction control valve therewithin to control the direction of pressurized air to said drive rotor within said drive motor housing.

3. An empowered circular saw apparatus for the cutting of material by either a left handed or a right handed operator, comprising:

an elongated base plate with a support frame extending from one side thereof; and an output housing supported on said support frame, with an elongated drive motor housing supported on one side of said support frame and a saw blade supported on the opposed side of said support frame, wherein said drive motor housing is swingable about an axis of rotation of an output shaft through said output housing to permit handed control of said saw apparatus to be changed.

4. The saw apparatus as recited in claim 3, wherein said drive motor housing encloses an air powered rotor by which said saw blade is rotated.

5. The saw apparatus as recited in claim 4, wherein said drive motor housing has an air direction control valve arranged therein, to permit control of direction of said rotor therein.

6. The saw apparatus as recited in claim 4, including a guide handle arranged in longitudinal alignment with said axis of rotation of said output shaft supporting said saw blade, said guide handle arranged for support of said saw apparatus by either hand of a user depending upon a left or right hand operation.

7. The saw apparatus as recited in claim 6, wherein said guide handle assists in control of said saw apparatus whether said saw apparatus is in a left-hand use mode or a right-hand use mode.

8. The saw apparatus as recited in claim 3, wherein said drive motor housing includes a dust blowing articulable nozzle.

9. The saw apparatus as recited in claim 3, including an elongated on/off switch arranged externally of said drive motor housing to permit said saw apparatus to be controlled whether said elongated drive motor housing is in a left-hand use mode or a right-hand use mode.

10. The saw apparatus as recited in claim 3, wherein said support frame has a tilt mechanism arranged with said output housing to permit said output shaft to be tilted with respect to said base plate.

11. The saw apparatus as recited in claim 3, wherein said support frame has a height control mechanism therein to permit a height adjustment to be made with respect to said output housing and said base plate.

12. The saw apparatus as recited in claim 3, wherein said drive motor housing encloses an electric motor by which said saw blade is rotated.

13. The saw apparatus as recited in claim 3, wherein a multi directionally movable saw blade shield is biasedly attached to said output housing to permit said shield to move in either direction depending upon the handed mode of operation on said saw apparatus.

14. The saw apparatus as recited in claim 3, including a releasable snap lock arranged on said motor housing to permit said output shaft to be locked temporarily in either direction depending upon the handed mode of operation on said saw apparatus.

* * * * *